United States Patent Office 3,445,533
Patented May 20, 1969

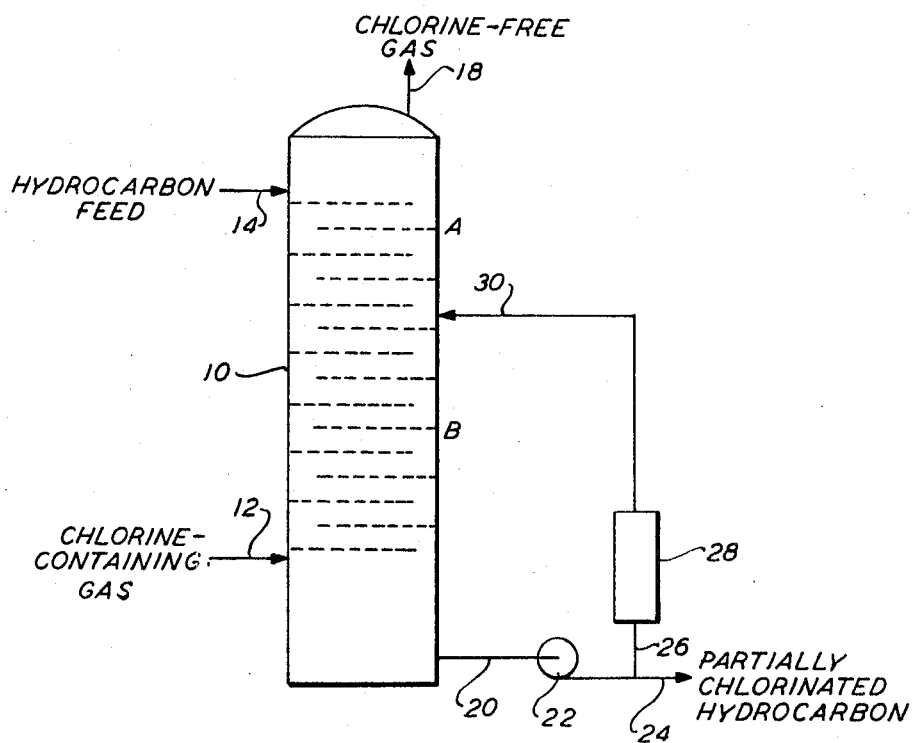

3,445,533
REMOVAL OF CHLORINE FROM NITROGEN OR HYDROGEN CHLORIDE BY REACTION WITH A HYDROCARBON
Henry O. Mottern, Far Hills, N.J., assignor, by mesne assignments, to Air Reduction Company, Incorporated, New York, N.Y., a corporation of New York
Continuation of application Ser. No. 198,648, May 29, 1962. This application Sept. 24, 1965, Ser. No. 497,585
Int. Cl. C07c 17/02, 19/00; B01d 53/00
U.S. Cl. 260—660     6 Claims This application is a continuation of copending application U.S. Ser. No. 198,648, filed May 29, 1962, now abandoned.

This invention relates to processes for removing chlorine from gases containing the same, and relates more particularly to a method for contacting a gas containing small amounts of chlorine with a paraffinic hydrocarbon material so as to remove substantially the entire chlorine content of the gas.

Various processes are known for chlorination of paraffin wax. Examples of such processes are described in U.S. Patent 2,941,013, issued June 14, 1960 to Jenney et al., and U.S. Patent 2,997,508, issued Aug. 22, 1961 to Stretton et al. As illustrated by these patents, chlorination of paraffin wax yields a by-product gas consisting primarily of hydrogen chloride and containing small amounts of chlorine. The chlorine content of the hydrogen chloride off gas from these wax chlorination processes must be removed before the hydrogen chloride can be used as a chemical reagent. It is not feasible to operate the chlorination processes so as to produce an off gas essentially free of chlorine; instead the chlorination processes are conducted under optimum conditions for chlorination of the wax, and this results in small amounts of chlorine in the off gas as already explained.

An object of this invention is to provide a process for removing substantially all of the chlorine from a gas containing chlorine.

Another object of this invention is to provide a process for purifying hydrogen chloride contaminated with small amounts of chlorine so as to obtain substantially pure hydrogen chloride which is suitable for use as a chemical reagent.

A further object of this invention is to provide a process for removing residual chlorine from an off gas obtained from a wax chlorination process.

A still further object in a preferred embodiment of this invention is to remove substantially the entire chlorine content of hydrogen chloride containing small amounts of chlorine obtained as an off gas from wax chlorination by contact of the off gas with a hydrocarbon which has a boiling point of about 400° to 1100° F. at atmospheric pressure and is either a solid or a liquid at atmospheric pressure and temperature.

These and other objects will be apparent from the specification which follows.

The sole figure of the drawing is a schematic diagram illustrating the process of this invention.

According to this invention a gas containing chlorine is purified to remove substantially the entire chlorine content by countercurrent contact with a paraffin wax. The purified gas containing not more than 0.1% chlorine is removed as an overhead product, and partially chlorinated wax is recovered as bottoms. A portion of the bottoms is recycled to an intermediate point between the top and the bottom of the gas-liquid contact column.

Any gas containing chlorine and a carrier gas which is inert to reaction with hydrocarbons may be treated according to this invention to remove substantially the entire chlorine content thereof. Preferably, the chlorine content of the gas does not exceed about 10% by weight. This invention is especially useful for the treatment of a gas mixture containing not more than about 10% by weight chlorine and the balance essentially hydrogen chloride, such as the off gases obtained from wax chlorination processes. While gases containing up to about 10% by weight chlorine can be satisfactorily treated according to this invention, best results are obtained when the incoming gas contains no more than about 5% by weight chlorine.

The hydrocarbon feedstock consists essentially of hydrocarbons having boiling points in the range of about 400° to about 1100° F. (about 200° to about 600° C.). Paraffin waxes, light gas oils, and lube oils are examples of hydrocarbons effective for scrubbing chlorine gas from gas mixtures according to this invention. The hydrocarbon feedstocks used in this invention consist essentially of hydrocarbons containing from about 15 to about 45 carbon atoms per molecule, and preferably from 18 to 30 carbon atoms per molecule. The hydrocarbon may be either a straight chain or a branched chain aliphatic hydrocarbon, or an aryl-substituted aliphatic hydrocarbon. Hydrocarbon mixtures consisting primarily of straight chain hydrocarbons and hydrocarbons having only a limited amount of branching are designated as paraffin waxes, and hydrocarbons of multiple branched chain structure are designated as isoparaffinic oils, such as lube oils for example. Either paraffinic or isoparaffinic hydrocarbons within the indicated boiling point and molecular weight ranges give good results in chlorine removal according to this invention. Where the present process is used in conjunction with a hydrocarbon chlorination process, choice of a feedstock is determined by the chlorinated hydrocarbon product desired. Examples of suitable feedstocks are those described in the aforementioned U.S. Patents 2,941,013 and 2,997,508.

Referring now to the drawing, the gas and the paraffin hydrocarbon are treated in a countercurrent gas-liquid contact column 10. The chlorine-containing gas is introduced via line 12 at a point near the bottom of the column. Fresh hydrocarbon is introduced via line 14 near the top of the column. The column is provided with a plurality of perforated plates 16. The chlorine-containing gas to be purified flows upwardly through the perforations in the plates in the column in countercurrent contact hydrocarbon which flows downwardly from plate to plate. The purified gas is removed via line 18 at the top of the column. The gas can be purified to a chlorine content not exceeding 0.1% and it is possible in some cases to reduce the chlorine content to as little as 0.01%. Hydrocarbon which has been partially chlorinated by contact with the chlorine-containing gas is removed as bottoms via line 20 and is pumped by pump 22. The partially chlorinated hydrocarbon stream is split into product stream 24 and recycle stream 26, which is passed through cooler 28 and thence returned to column 10 via line 30 which is located at a point intermediate between the top and the bottom of column 10. In a preferred embodiment, the incoming gas stream 12 is obtained from a wax chlorination process, such as that described in Patent 2,997,508, and the partially chlorinated wax in product stream 24 is conveyed to the wax chlorination process.

The temperature in column 10 is maintained at a minimum value of about 90° C. More efficient chlorine removal is obtained if the temperature is in excess of about 110° C. Fewer plates are required when the temperature is maintained at or about this level. The maximum temperature in the column is limited only by the decomposition temperature of the partially chlorinated paraffin wax. Temperatures as high as about 150° C. do not result in any significant decomposition of wax, but higher temperatures are ordinarily not preferred because the amount of decomposition increases as the temperature rises. The pressure in the column may range anywhere from approximately atmospheric pressure or even slightly subatmospheric pressures upward. The maximum pressure is limited primarily by economic feasibility. Ordinarily no particular advantages are realized in operating at pressures below atmospheric pressure or in excess of about 80 p.s.i.g. Preferred operating conditions range from about 0 to about 35 p.s.i.g.

The ratio of gas to hydrocarbon can be varied over wide limits. When the process of this invention is carried out in conjunction with a hydrocarbon chlorination process, the ratio of gas to hydrocarbon is generally determined by the percentage of chlorine desired in the chlorinated hydrocarbon product. The present invention can be carried out satisfactorily at any gas to hydrocarbon ratio which gives a partially chlorinated hydrocarbon effluent in line 20 containing no more than 8% by weight of chlorine. Preferably the effluent contains a maximum of 5% by weight of chlorine. The chlorine content of the effluent partially chlorinated hydrocarbons is ordinarily not less than 0.5% by weight, because excessively large amounts of fresh hydrocarbon feed are required if the effluent contains less than 0.5% chlorine. When the chlorine content of the effluent partially chlorinated hydrocarbon does not exceed 8%, it is possible to obtain an off gas which contains no more than 0.1% by weight of chlorine, and preferably 0.01% to 0.05% by weight of chlorine.

A substantial portion of the partially chlorinated hydrocarbon effluent in line 20 is recycled in order to increase the efficiency of chlorine absorption in column 10. Removal of chlorine from the gas stream is much more complete than it would be in a conventional absorption column using the same amount of fresh feed hydrocarbon without recycle. Recycle is also vital in maintaining proper hydraulic flow in column 10 with the large gas volumes per unit amount of fresh wax generally employed.

The recycle stream is reintroduced via line 30 into column 10 at a point intermediate between the top and bottom thereof, thereby defining an upper zone A and a lower zone B in column 10. There is a large volume of liquid flowing downwardly in zone B, and the chlorine content of this liquid remains substantially constant throughout the zone. The liquid flowing downwardly in zone A consists entirely of fresh hydrocarbon feed introduced through pipe 14. The volume of liquid in zone A is much smaller than in zone B. The fresh hydrocarbon picks up some chlorine in zone A, but the chlorine content of the fresh hydrocarbon feed in the lower portion of zone A, just before it is mixed with the recycle stream, is usually less than 0.5% by weight. Most of the chlorine content (usually about 95% to 97%) of the incoming gas is removed in zone B. Zone A serves as a highly efficient cleanup zone where all except small traces of the remaining chlorine is removed, resulting in an off gas from column 10 containing no more than 0.1% by weight chlorine and generally about 0.01% to 0.05% chlorine as previously indicated.

Applicant has found that the chlorine absorption rate drops sharply as the chlorine content of the hydrocarbon rises. There is a drop of about 40 to 45% in the absorption rate for each additional 5% by weight of chlorine in the hydrocarbon. Thus the absorption rate of partially chlorinated hydrocarbon containing 5% by weight of chlorine is about 55% to 60% of the absorption rate of fresh hydrocarbon feed. Applicant has found that maximum absorption efficiency is attained by introducing the recycle stream at an intermediate point in the column and thereby providing two absorption zones A and B. In this way the relatively chlorine-rich gas entering the bottom of the column is contacted with a large volume of liquid absorbent so that most of the chlorine content of the gas is removed in lower zone B. The gas is then contacted with fresh hydrocarbon in zone A, where advantage is taken of the high absorption rate of fresh hydrocarbon so that only traces of chlorine remain in the off gas. The procedure of this invention results in more complete chlorine removal than that attainable with the same quantity of fresh hydrocarbon either in the absence of recycle or with recycle to the top of the scrubbing column.

The amount of recycled partially chlorinated hydrocarbon is from about 3 to about 60 volumes per hour per volume of liquid on the plates in zone B of column 10. In other words, the amount of recycle is such that the average residence time of liquid in zone B of column 10 is from 1 to 20 minutes. The ratio of recycle to fresh feed, hereinafter referred to as recycle ratio, is at least 10:1 for proper operation. The recycle ratio can be as high as 100:1 or even higher. Optimum recycle ratios lie in the range of about 20:1 to about 50:1.

This invention will now be described with reference to specific embodiments thereof as illustrated by the following examples.

EXAMPLE 1

A 10-plate column having top and bottom sections, a liquid inlet and gas exit at the top, a liquid outlet and gas inlet at the bottom, and a recycle return inlet on the seventh plate (numbering upwardly from the bottom) is used in the runs in this example. The plates are six inches in diameter, spaced six inches apart, are perforated and have weirs which are adjustable to a height of either one inch or two inches. The liquid capacity of the column is about 5.5 to 6 liters at a weir height of one inch, and about 7.8 to 8.8 liters at a weir height of two inches. The recycle line is equipped with a heat exchanger.

A feed gas consisting of nitrogen and chlorine is introduced into the bottom of the column at atmospheric pressure. A feedstock consisting essentially of straight chain $C_{24}$ to $C_{29}$ paraffinic hydrocarbons having a specific gravity of 0.81 is introduced into the top of the column. The hydrocarbon flows downwardly from plate to plate, countercurrently contacting the gas and becoming chlorinated to a limited extent. A large portion of the partially chlorinated hydrocarbon effluent is recycled to the seventh plate. Quantities and reaction conditions in each run are indicated in Table I below:

TABLE I

| | Run 1 | Run 2 | Run 3 | Run 4 |
|---|---|---|---|---|
| Chlorine feed, liters/min | 0.20 | 0.44 | 0.44 | 0.20 |
| Nitrogen feed, liters/min | 21.3 | 21.3 | 21.3 | 21.3 |
| Feed gas temperature, °C | 29 | 29 | 30 | 26 |
| Column temperature, °C | 112 | 106 | 112 | 119 |
| Hydrocarbon feed rate, liters/hr | 2.0 | 1.8 | 1.8 | 1.6 |
| Recycle rate, liters/hr | 480 | 480 | 480 | 480 |
| Weir height, inches | 1 | 2 | 2 | 2 |
| Wt. percent of $Cl_2$ in feed gas | 1.79 | 3.86 | 3.86 | 1.79 |
| Wt. percent of $Cl_2$ absorbed | 95.7 | 98.9 | 99.3 | 100 |
| Wt. percent of $Cl_2$ in overhead gas | .077 | .042 | .026 | 0 |
| Wt. percent of Cl in hydrocarbon | 2.6 | 1.7 | 1.7 | 1.6 |

EXAMPLE 2

The procedure of Example 1 is followed except that hydrogen chloride is substituted for an equal volume of nitrogen in the feed gas. The amount of chlorine removed in each run and the off gas composition is about the same as in the corresponding runs in Example 1.

EXAMPLE 3

The apparatus in this example is a 24-plate column, 3 feet in diameter, having top and bottom sections, a liquid outlet and gas inlet at the bottom, a liquid inlet and gas outlet at the top, and a recycle line equipped with a heat exchanger leading from the bottom to the 16th plate, counting upwardly from the bottom. The plates are perforated and have weirs.

A hydrocarbon feed as described in Example 1 is introduced into the top of the column. Impure hydrogen chloride gas containing a small amount of chlorine is introduced into the bottom of the column. The gas and hydrocarbon flow countercurrently in contact with each other in column 10. Partially chlorinated hydrocarbon is removed as bottoms. A large portion of this bottoms is recycled and the remainder is conveyed to a wax chlorination unit. Pure hydrogen chloride gas containing only traces of chlorine is recovered overhead.

Operating conditions in two runs are given in Table II below. Gas volumes are measured at standard temperature and pressure.

TABLE II

|  | Run 1 | Run 2 |
|---|---|---|
| Cu. ft. impure HCl/cu. ft. hydrocarbon feed | 614 | 653 |
| Cu. ft. impure HCl/cu. ft. recycle | 22.1 | 23.5 |
| Recycle ratio | 27.8 | 27.8 |
| Liquid temperature in column, °C | 111 | 112 |
| Pressure in column, p.s.i.g | 2.5 | 2.5 |
| Weir height on plates, inches | 2 | 2 |
| Wt. percent of $Cl_2$ in feed gas | 0.77 | 1.75 |
| Wt. percent of $Cl_2$ in effluent HCl | 0.038 | 0.09 |
| Percent of chlorine absorbed | 95.0 | 95.0 |

While this invention has been described with reference to specific embodiments thereof, it is understood that the scope of the invention is measured only by the scope of the appended claims.

I claim:

1. A process for removing substantially the entire chlorine content of a gas stream containing from 0.77% to about 5% by weight of chlorine to produce a gas stream having a chlorine content of at most 0.1% by weight wherein said gas is selected from the group consisting of nitrogen and hydrogen chloride which comprises continuously countercurrently contacting said gas containing chlorine with a hydrocarbon mixture consisting essentially of hydrocarbons containing at least 15 and not more than 45 carbon atoms per molecule in the liquid state in a contact zone at a temperature of 110° to 150° C. to effect partial chlorination of said hydrocarbon mixture, recycling partially-chlorinated hydrocarbon mixture to said contact zone in a recycle ratio of at least 10:1 to produce a chlorinated hydrocarbon mixture having a chlorine of at most 0.1% and a partialy-chlorinated hy- and separately recovering a gas having a content of chlorine of at least 0.1% and a partialy-chlorinated hydrocarbon mixture containing not more than about 5% by weight of chlorine, said recycling partially-chlorinated hydrocarbon mixture being introduced into said contact zone at a point below the point of introduction of said first-named hydrocarbon mixture but above the point of introduction into said contact zone of said gas containing chlorine, the residence time in the portion of said contact zone below the point of introduction of the recycling partially-chlorinated hydrocarbon mixture being from about 1 to about 20 minutes.

2. A process for removing substantially the entire chlorine content of a gas stream containing from 0.77% to about 5% by weight of chlorine to produce a gas stream having a chlorine content of at most 0.1% by weight wherein said gas is selected from the group consisting of nitrogen and hydrogen chloride which comprises continuously passing a stream of said gas containing chlorine upwardly through a gas-liquid contact zone, continuously introducing a hydrocarbon feedstock in the liquid state at the top of said zone, said hydrocarbon feedstock consisting essentially of hydrocarbons containing at least 15 and not more than 45 carbon atoms per molecule, passing said hydrocarbon feedstock downwardly through said zone countercurrent to said gas, maintaining a temperature of 110° to 150° C. in said zone to effect partial chlorination of said hydrocarbon feedstock, recovering a stream of gas substantially free of chlorine overhead, withdrawing partially-chlorinated hydrocarbon feedstock from the bottom of said zone, recovering a portion of said partially-chlorinated hydrocarbon feedstock, and recycling a second portion of said partially-chlorinated hydrocarbon feedstock to said contact zone in a recycle ratio of at least 10:1 to produce a chlorinated hydrocarbon feedstock having a clorine content of at least 0.5% but at most about 5%, said recycling partially-chlorinated hydrocarbon feedstock being introduced into said contact zone at a point below the point of introduction of said feedstock but above the point of introduction into said contact zone of said stream of gas containing chlorine, the residence time in the portion of said contact zone below the point of introduction of the recycling partially-chlorinated hydrocarbon feedstock being from about 1 to about 20 minutes.

3. A process for removing substantially the entire chlorine content of a gas stream comprising a major proportion of nitrogen and a minor proportion of chlorine in the amount of 0.77% to about 5% by weight to produce a gas stream having a chlorine content of at most 0.1% by weight which comprises introducing said first-named gas stream into a gas-liquid countercurrent contact zone near the bottom thereof, introducing fresh paraffin wax at the top of said gas-liquid countercurrent contact zone, contacting said gas stream and said wax at a temperature of 110° to 150° C. to effect partial chlorination of said wax, recovering a bottoms stream consisting essentially of partially-chlorinated wax, recycling a portion of said partially-chlorinated wax to said contact zone in a recycle ratio of 20:1 to about 50:1 to produce a chlorinated hydrocarbon having a chlorine content of at least 0.5% but at most 8%, and recovering an overhead stream of inert carrier gas having a content of chlorine of at most 0.1% by weight, said recycling partially-chlorinated wax being introduced into said contact zone at a point below the point of introduction of said fresh paraffin wax but above the point of introduction into said contact zone of said first-named gas stream, the residence time in the portion of said contact zone below the point of introduction of the recycling partially-chlorinated paraffin wax being from about 1 to about 20 minutes.

4. A process for treating the off gas from a paraffin wax chlorination process containing from 0.77% to about 5% by weight of chlorine to remove substantially the entire chlorine content thereof and to produce a gaseous product having a chlorine content of at most 0.1% by weight, which comprises continuously countercurrently contacting said off gas with paraffin wax in a contact zone at a temperature of 110° to 150° C. for an extent to chlorinate said wax to a chlorine content of at least 0.5% but at most about 5%, recovering said gaseous product having a content of chlorine of at most 0.1% by weight, separately recovering the partially-chlorinated paraffin wax, recycling a portion of said partially-chlorinated paraffin wax to said contact zone in a recycle ratio of 20:1 to about 50:1 at about the middle of said zone, and passing the remainder of said partially-chlorinated paraffin wax to said paraffn wax chlorination process, said recycling partially-chlorinated paraffin wax being introduced into said contact zone at a point below the point of introduction of said paraffin wax but above the point of introduction into said contact zone of said off gas, the residence time in the portion of said contact zone below the point of introduction of the recycling partially-chlorinated paraffin wax being from about 1 to about 20 minutes.

5. In a continuous multiple stage process for chlorination of a paraffinic hydrocarbon mixture wherein said mixture and a chlorinating gas flow countercurrently from stage to stage, a chlorinated hydrocarbon mixture is withdrawn from the last stage and a gas containing a major proportion of hydrogen chloride and a minor proportion of chlorine is withdrawn from the first stage, the improvement which comprises continuously countercurrently contacting in a contact zone the gas withdrawn from said first stage with a paraffinic hydrocarbon mixture which is initially chlorine-free and consists essentially of hydrocarbons containing at least 15 and not more than 45 carbon atoms per molecule, in the liquid state at a temperature of 110° to 150° C. to effect partial chlorination of said hydrocarbon mixture, recycling a portion of the partially-chlorinated hydrocarbon mixture to said contact zone in a recycle ratio of at least 10:1 to produce a chlorinated hydrocarbon mixture having a chlorine content of at least 0.5% but at most about 5%, and separately recovering a gas having a content of chlorine of at most 0.1% and a partially-chlorinated hydrocarbon mixture containing not more than about 5% by weight of chlorine, said recycling partially-chlorinated hydrocarbon mixture being introduced into said contact zone at a point below the point of introduction of said first-named hydrocarbon mixture but above the point of introduction into said contact zone of said gas containing chlorine, the residence time in the portion of said contact zone below the point of introduction of the recycling partially-chlorinated hydrocarbon mixture being from about 1 to about 20 minutes, and introducing the remainder of said partially-chlorinated hydrocarbon mixture into the first stage of said multiple stage chlorination process.

6. In a continuous multiple stage process for chlorination of a paraffin wax wherein said wax and a chlorinating gas flow countercurrently from stage to stage, a chlorinated wax is withdrawn from the last stage and a gas stream containing a major proportion of hydrogen chloride and 0.77% to about 5% by weight of chlorine is withdrawn from the first stage, the improvement which comprises continuously introducing said gas stream into a gas-liquid countercurrent contact zone near the bottom thereof, introducing fresh paraffin wax at the top of said gas-liquid countercurrent contact zone, contacting said gas stream and said wax at a temperature of 110° to 150° C. to effect partial chlorination of said wax, recovering a bottoms stream consisting essentially of partially-chlorinated wax, recycling a portion of said partially-chlorinated wax to said contact zone in a recycle ratio of 20:1 to about 50:1 to produce a chlorinated paraffin wax having a chlorine content of at least 0.5% but at most about 5%, and recovering an overhead stream of hydrogen chloride having a content of chlorine of at most 0.1% by weight, said recycling partially-chlorinated wax being introduced into said contact zone at a point below the point of introduction of said fresh paraffin wax but above the point of introduction into said contact zone of said gas stream, the residence time in the portion of said contact zone below the point of introduction of the recycling partially-chlorinated paraffin wax being from about 1 to about 20 minutes, and introducing the remainder of said partially-chlorinated paraffin wax into the first stage of said multiple stage chlorination process.

References Cited

UNITED STATES PATENTS 2,403,179 7/1946 Hull et al. _____ 260—660
2,997,508 8/1961 Stretton et al. _____ 260—660

BERNARD HELFIN, *Acting Primary Examiner.*

T. G. DILLAHUNTY, *Assistant Examiner.*

U.S. Cl. X.R.
23—154, 220

PO-1050
(5/69)

UNITED STATES PATENT OFFICE
CERTIFICATE OF CORRECTION

Patent No. 3,445,533     Dated May 20, 1969

Inventor(s)    Henry O. Mottern

It is certified that error appears in the above-identified patent and that said Letters Patent are hereby corrected as shown below:

Column 5, line 43, delete "of at most 0.1% and a partialy-chlorinated hy-" and insert -- content of at least 0.5% but at most about 5%, --.
Column 6, line 4, "clorine" should read -- chlorine --.

SIGNED AND
SEALED

OCT 21 1969

(SEAL)
Attest:

Edward M. Fletcher, Jr.
Attesting Officer

WILLIAM E. SCHUYLER, JR.
Commissioner of Patents